(12) United States Patent
Takeo

(10) Patent No.: US 9,488,242 B2
(45) Date of Patent: Nov. 8, 2016

(54) SHOCK ABSORBER

(71) Applicant: KAYABA INDUSTRY CO., LTD., Tokyo (JP)

(72) Inventor: Satoru Takeo, Gifu (JP)

(73) Assignee: KYB Corporation, Tokyo (JP)

( * ) Notice: Subject to any disclaimer, the term of this patent is extended or adjusted under 35 U.S.C. 154(b) by 0 days.

(21) Appl. No.: 14/396,611

(22) PCT Filed: May 13, 2013

(86) PCT No.: PCT/JP2013/063311
§ 371 (c)(1),
(2) Date: Oct. 23, 2014

(87) PCT Pub. No.: WO2013/175989
PCT Pub. Date: Nov. 28, 2013

(65) Prior Publication Data
US 2015/0096855 A1  Apr. 9, 2015

(30) Foreign Application Priority Data
May 22, 2012 (JP) .................................. 2012-116199

(51) Int. Cl.
*F16F 9/38*  (2006.01)
*B60G 13/02*  (2006.01)
*F16F 9/36*  (2006.01)
*F16F 9/19*  (2006.01)
*F16F 9/32*  (2006.01)

(52) U.S. Cl.
CPC .................. *F16F 9/38* (2013.01); *B60G 13/02* (2013.01); *F16F 9/19* (2013.01); *F16F 9/3285* (2013.01); *F16F 9/36* (2013.01)

(58) Field of Classification Search
CPC ............ F16F 9/38; F16F 9/19; F16F 9/3285; F16F 9/36; B60G 13/06; B60G 13/02
USPC ............ 188/322.12, 322.14, 322.16, 322.17, 188/315; 267/64.21, 64.24, 136; 280/124.155
See application file for complete search history.

(56) References Cited

U.S. PATENT DOCUMENTS 6,199,672 B1 *  3/2001  Wada ........................ F16F 9/38
                                                188/322.12
7,896,142 B2 *  3/2011  Vanhees ................. B60G 13/06
                                                188/322.12

FOREIGN PATENT DOCUMENTS

| CN | 2385144 Y | 6/2000 |
| CN | 101680505 A | 3/2010 |
| JP | 59-039342 U | 3/1984 |
| JP | S59-197635 A | 11/1984 |
| JP | H10-089397 A | 4/1998 |
| JP | 2000-081071 A | 3/2000 |
| JP | 2008-175232 A | 7/2008 |
| JP | 2009-056852 A | 3/2009 |
| JP | 2010-175043 A | 8/2010 |
| JP | WO-2014/024676 A1 * | 2/2014 |

* cited by examiner

Primary Examiner — Pamela Rodriguez
(74) Attorney, Agent, or Firm — Rabin & Berdo, P.C.

(57) ABSTRACT

A shock absorber includes a shock absorber body having a cylinder outer shell and a piston rod capable of going in/out of the outer shell and generating a damping force suppressing relative movement of the piston rod in an axial direction with respect to the outer shell, a cylindrical dust cover connected to the piston rod and allowing entry of the outer shell into an inside, and a cylindrical collar attached to the outer shell and arranged on an outer periphery of the piston rod.

9 Claims, 4 Drawing Sheets

SHOCK ABSORBER

TECHNICAL FIELD

The present invention relates to improvement of a shock absorber.

BACKGROUND ART

A shock absorber is provided with an outer shell and a piston rod inserted into the outer shell, capable of going in/out. The shock absorber exerts a damping force for suppressing relative movement of the piston rod with respect to the outer shell when the piston rod is relatively moved in an axial direction with respect to the outer shell. The shock absorber is interposed between a vehicle body and an axle in a vehicle or between a cabin and the vehicle body, for example, and can suppress vibration of a vibration damping target such as the vehicle body, the cabin and the like by exerting the damping force.

Since the shock absorber is used by being exposed to an outside, dirt, dusts and mud (hereinafter referred to as "mud and the like") can easily adhere to the piston rod. The mud and the like adhering to an outer periphery of the piston rod are scraped off by a dust seal sealing the outer periphery of the piston rod when the piston rod enters into the outer shell. However, if the mud and the like are dried and firmly adhere to the piston rod, the mud and the like cannot be sufficiently scraped off by the dust seal, and there is a possibility that deterioration of an oil seal provided on an inner side of the dust seal is promoted.

JP2000-81071A discloses protection of the piston rod from mud and the like by mounting a dust cover covering the outer periphery of the piston rod on the shock absorber.

SUMMARY OF INVENTION

In a shock absorber provided with a dust cover, the longer the length of the dust cover is, the more reliably adhesion of mud and the like to the piston rod can be prevented. An outer surface of the outer shell is spray-coated with an anti-rust paint, but if the length of the dust cover becomes larger, the dust cover covers the outer shell longer, and thus, an unpainted portion is generated particularly in the vicinity of an upper end of the outer shell.

Therefore, by setting an entire length of the dust cover to such a degree that the upper end of the outer shell is scarcely covered when the shock absorber is expanded to the maximum, generation of the unpainted portion can be prevented. However, if the entire length of the dust cover is set as above, mud and the like can easily enter into the dust cover between the outer shell and the dust cover, and a protection effect for protecting the outer periphery of the piston rod deteriorates.

Alternatively, instead of extending the entire length of the dust cover to such a degree that entry of mud and the like can be sufficiently suppressed, the dust cover can be applied with spray-coating before attachment. However, in this case, it is necessary that the outer periphery of the outer shell should be spray-coated in a state in which the piston rod is pushed into the outer shell so that the shock absorber is maintained in the most contracted state so that a sliding surface of the outer periphery of the piston rod is not painted. Therefore, since the spray-coating needs to be performed by setting the shock absorber on a machine, the coating process requires labor and processes.

It is an object of the present invention to provide a shock absorber capable of preventing deterioration of coating workability while the outer periphery of the piston rod is protected.

According to one aspect of the present invention, a shock absorber includes a shock absorber body having a cylindrical outer shell and a piston rod capable of going in/out of the outer shell and adapted to generate a damping force suppressing relative movement of the piston rod in an axial direction with respect to the outer shell, a cylindrical dust cover connected to the piston rod and adapted to allow entry of the outer shell to an inside, and a cylindrical collar attached to the outer shell and arranged on an outer periphery of the piston rod.

Embodiments of the present invention and advantages thereof are described in detail below with reference to the accompanying drawings.

DESCRIPTION OF EMBODIMENTS

Hereinafter, an embodiment of the present invention is described with reference to the drawings.

Figure 1:
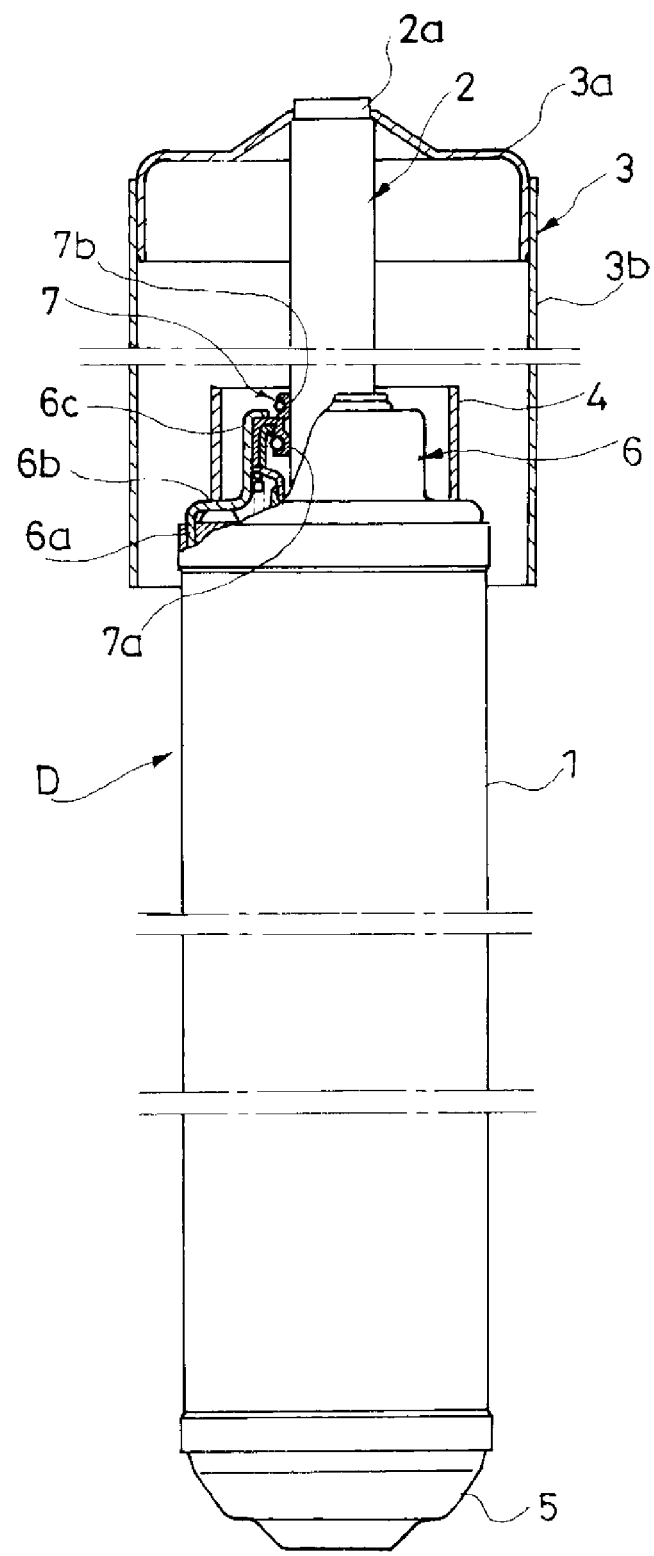
FIG. 1 is a side view of a shock absorber according to an embodiment of the present invention.

As illustrated in FIG. 1, a shock absorber includes a shock absorber body D having a cylindrical outer shell 1 and a piston rod 2 capable of going in/out of the outer shell 1 and generating a damping force for suppressing relative movement of the piston rod 2 in an axial direction with respect to the outer shell 1, a cylindrical dust cover 3 connected to the piston rod 2 and allowing entry of the outer shell 1 with respect to an inside, and a cylindrical collar 4 attached to the outer shell 1 and arranged on an outer periphery of the piston rod 2.

The shock absorber body D includes an inner tube (not shown) accommodated in the outer shell 1, a piston (not shown) slidably inserted into the inner tube, the piston rod 2 having one end connected to the piston and movably inserted into the inner tube, an expansion side chamber (not shown) and a compression side chamber (not shown) defined by the piston in the inner tube, and a passage (not shown) having the expansion side chamber and the pressure side chamber communicate with each other. A liquid such as operating oil is filled in the expansion side chamber and the compression side chamber. The liquid may be water, an aqueous solution and the like, for example, other than the operating oil.

When the piston rod 2 is relatively moved by an external force in the axial direction with respect to the outer shell 1, that is, when the shock absorber body D is expanded/contracted by the external force, the piston moves in the axial direction together with the piston rod 2. As a result, the expansion side chamber or the compression side chamber in the inner tube is compressed, and a differential pressure is generated between the expansion side chamber and the compression side chamber. The shock absorber body D exerts the damping force for suppressing the relative movement in the axial direction of the outer shell 1 and the piston rod 2 by receiving this differential pressure by the piston.

The shock absorber body D of this embodiment is a single-rod type in which the piston rod 2 is inserted only into the expansion side chamber and thus, a reservoir (not shown) in which a gas and a liquid are filled is provided in an annular gap between the outer shell 1 and the inner tube. The reservoir compensates for a volume of the piston rod 2 going in/out of the outer shell with expansion/contraction of the shock absorber body D. That is, the shock absorber body D of this embodiment is a single-rod double-cylinder type.

The shock absorber body D may be of a single-cylinder type not having the above-described inner tube. In this case, the expansion side chamber and the compression side chamber are defined in the outer shell 1 by directly sliding the piston on an inner periphery of the outer shell 1. Moreover, a gas chamber for compensating for the volume of the piston rod 2 is defined by slidably inserting a free piston in the outer shell 1, or a gas chamber is defined in the outer shell 1 by an elastic partition wall such as a bladder. Moreover, the shock absorber body D may be a double-rod type instead of the single-rod type.

Each portion will be explained below in detail.

The outer shell 1 has a cylindrical shape and has a lower end in FIG. 1 sealed by a cap 5, and a cylindrical seal case 6 is mounted on an upper end in FIG. 1 which is a piston-rod side end of the outer shell 1.

The seal case 6 includes a cylindrical large-diameter portion 6a mounted on an inner periphery of the piston-rod side end of the outer shell 1, an annular flange portion 6b extended inward from the piston-rod side end of the large-diameter portion 6a, and a cylindrical small-diameter portion 6c extended toward an axial direction of the piston rod 2 (upward in FIG. 1) from an inner periphery of the flange portion 6b. A seal member 7 is accommodated inside the small-diameter portion 6c.

The seal member 7 includes a seal portion 7a preventing leakage of the liquid from inside the outer shell 1 by sealing the outer periphery of the piston rod 2 through sliding contact with the outer periphery of the piston rod 2 and a dust seal portion 7b for scraping off dusts adhering to the outer periphery of the piston rod 2 through sliding contact with the outer periphery of the piston rod 2.

The dust cover 3 is mounted on an upper end 2a in FIG. 1 of the piston rod 2. The dust cover 3 includes an annular connection portion 3a having an inner periphery attached to the outer periphery of the piston rod 2 and a cover body 3b extending downward in FIG. 1 from the outer periphery of the connection portion 3a. An inner diameter of the cover body 3b is larger than an outer diameter of the outer shell 1 so that the outer shell 1 can enter into the cover body 3b. As a result, the dust cover 3 does not interfere with expansion/contraction of the shock absorber body D.

The collar 4 has a cylindrical shape, and an entire periphery on an end on the outer shell side which is a lower end in FIG. 1 is welded and fixed to an upper surface of the flange portion 6b of the seal case 6. The collar 4 is attached to the outer shell 1 through the seal case 6 but may be directly attached to the outer shell 1.

The collar 4 is located in the dust cover 3 even if the shock absorber body D is in the most expanded state and is arranged in the dust cover 3 all the time regardless of the expanded/contracted state of the shock absorber body D. An outer diameter of the collar 4 is set to a diameter smaller than an inner diameter of the dust cover 3 so that the collar 4 does not interfere with the dust cover 3. Moreover, the entire length of the collar 4 is set to a length of such a degree that does not interfere with the dust cover 3 even if the shock absorber body D is contracted the most. Moreover, since an inner diameter of the collar 4 is set to a diameter larger than the outer diameter of the piston rod 2, the collar 4 does not interfere with the piston rod 2. Therefore, the collar 4 does not influence expansion/contraction of the shock absorber body D.

In the shock absorber of this embodiment, since the collar 4 is provided as above, mud and the like entering into the dust cover 3 by passing between the dust cover 3 and the outer shell 1 can no longer contact the piston rod 2 unless the mud and the like go around from above the collar 4. As a result, a path for which the mud and the like reach the piston rod 2 becomes longer than a shock absorber not provided with the collar 4 and thus, adhesion of mud and the like to the piston rod 2 can be prevented. By setting an upper end of the collar 4 in FIG. 1 higher than an upper end of the dust seal portion 7b which is an upper end of the seal member 7, the effect of preventing adhesion of mud and the like to the piston rod 2 can be further improved.

Moreover, since the collar 4 is provided, the length of the dust cover 3 does not have to be made longer and thus, generation of an unpainted portion on the outer surface of the outer shell 1 can be prevented, and occurrence of rust on the outer shell 1 can be prevented. Moreover, since it is possible to apply spray-coating to the outer surface of the outer shell 1 without maintaining the shock absorber body D in the most contracted state before attachment of the dust cover 3 or masking the outer periphery of the piston rod 2, painting work can be simplified.

That is, according to the shock absorber of this embodiment, while the outer periphery of the piston rod 2 is sufficiently protected from mud and the like, deterioration of paintability on the outer shell 1 can be prevented.

In this embodiment, the collar 4 is welded to the flange portion 6b of the seal case 6 but it may be also welded to the small-diameter portion 6c. However, since the path for which the mud and the like reach the piston rod 2 can be made longer if the outer diameter of the collar 4 is made larger, the collar 4 is more preferably welded to the flange portion 6b. Moreover, though it is also possible to enlarge a diameter of the collar 4 on the upper end side in FIG. 1 so as to make the length of the path for which the mud and the like reach the piston rod 2 longer and to weld the collar 4 to the small-diameter portion 6c, but working for enlarging the diameter of the collar 4 or for reducing the diameter of the lower end becomes necessary. If the shape of the collar 4 is a simple cylindrical shape, a working cost can be kept low, and thus, making the shape of the collar 4 cylindrical and welding it to the flange portion 6b as in this embodiment is more preferable.

Moreover, since the collar 4 is arranged on the outer periphery of the piston rod 2, and the entire periphery of the collar 4 on the outer shell side end is welded to the seal case 6, even if the liquid in the outer shell 1 rides across the seal member 7 and leaks out to the outside, the collar 4 functions as a liquid reservoir and can prevent leakage of the liquid to the outside of the shock absorber. If it is not necessary to make the collar 4 function as the liquid reservoir, the collar 4 does not have to be welded on the entire periphery. In this case, instead of welding, the collar 4 may be attached to the upper end of the seal case 6 or the outer shell 1 by press-in, screwing fastening and the like.

Figure 2:
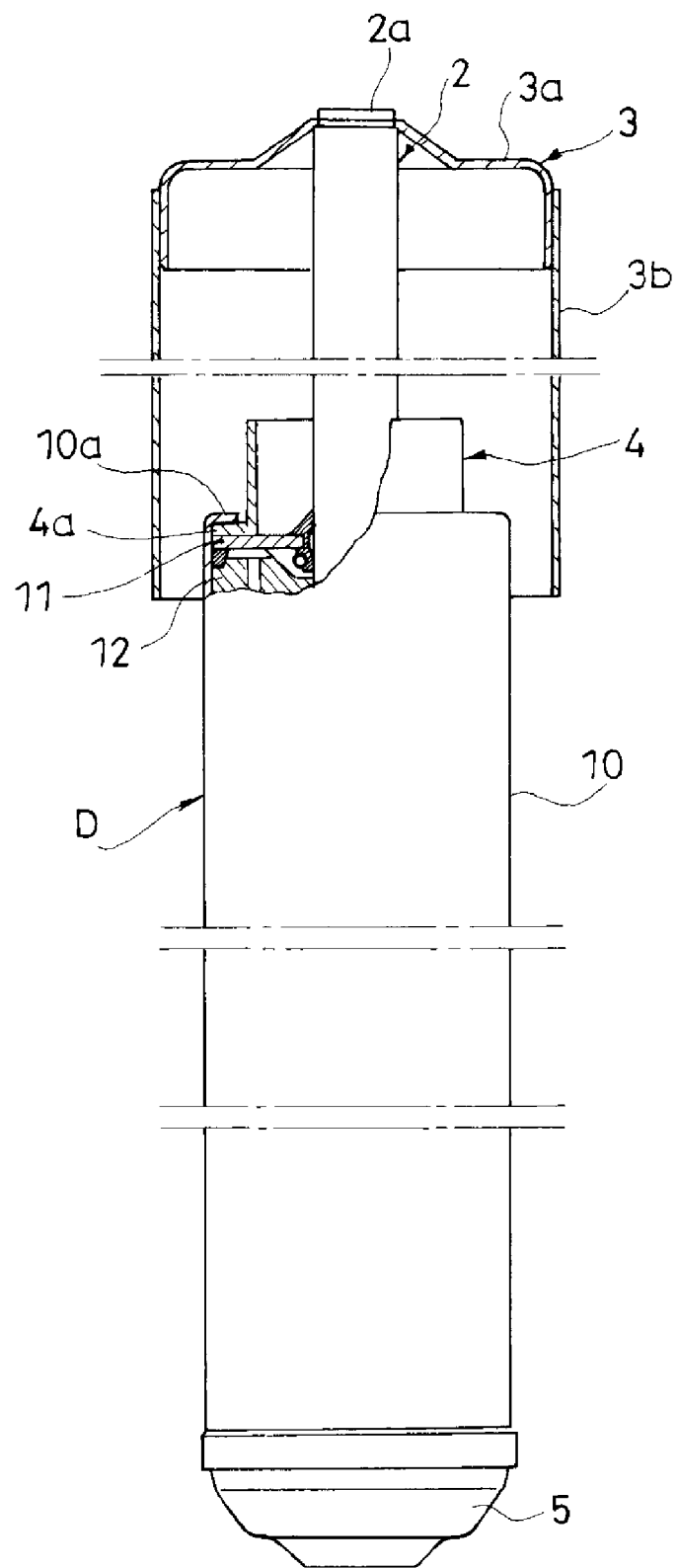
FIG. 2 is a side view of the shock absorber according to another embodiment of the present invention.

On the other hand, as a structure for attaching the collar 4 to the outer shell 1, a structure illustrated in FIG. 2 may be employed. A shock absorber illustrated in FIG. 2 has a bent portion 10a formed by bending the upper end in FIG. 2 which is the piston rod side end of the outer shell 10 inward. The bent portion 10a fixes the seal member 11 for sealing the outer periphery of the piston rod 2 and a rod guide 12 pivotally supporting the outer periphery of the piston rod 2 to an outer shell 10.

The collar 4 has an annular fixing flange 4a extended outward from the outer shell side end of the collar 4 and inserted into an inner periphery of the piston rod side end of the outer shell 10. The collar 4 is fixed to the outer shell 10 by gripping of the fixing flange 4a by the bent portion 10a. In this case, since the collar 4 functions also as the liquid reservoir, leakage of the liquid to the outside of the shock absorber can be prevented.

Figure 3:
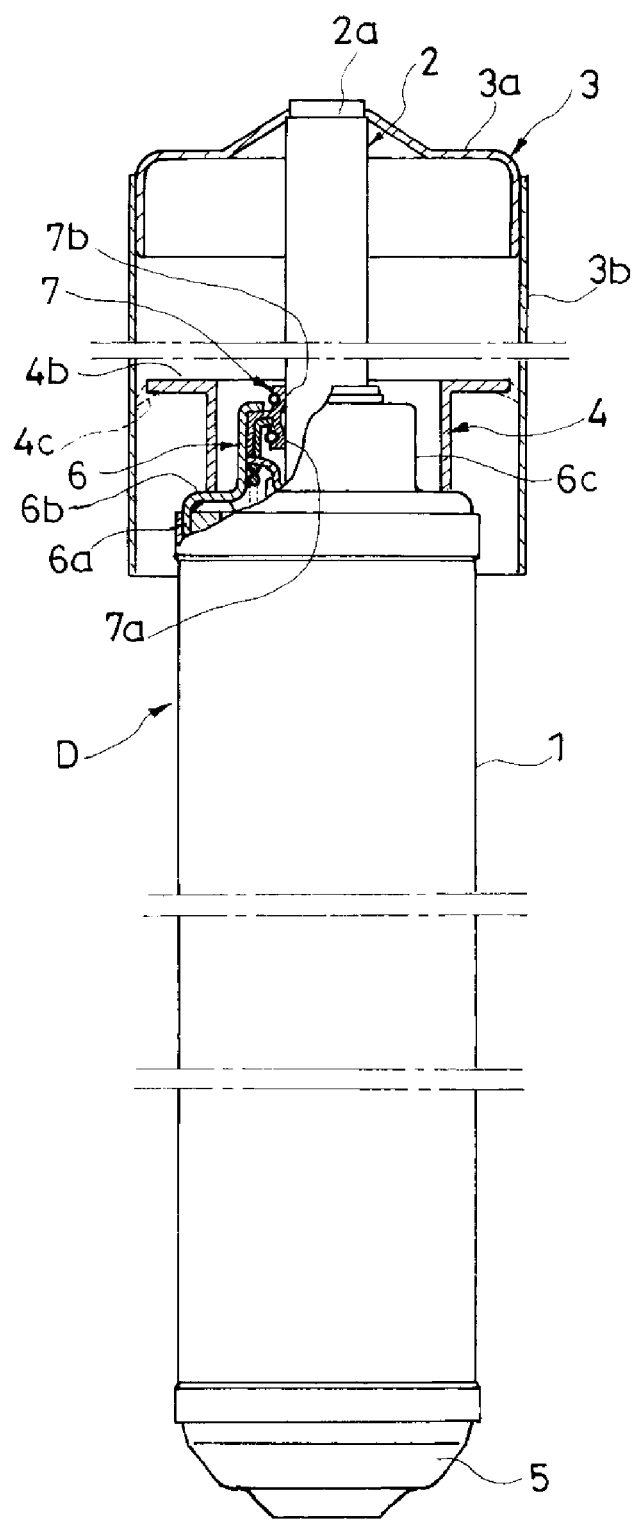
FIG. 3 is a side view of the shock absorber according to still another embodiment of the present invention.

On the other hand, as illustrated in FIG. 3, a flange 4b extended to the outer periphery side may be provided on the piston rod side end which is an upper end of the collar 4 in FIG. 3. By providing the flange 4b, the path for which the mud and the like reach the piston rod 2 can be further made longer. Moreover, since a gap between the collar 4 and the inner periphery of the dust cover 3 is reduced, entry of the mud and the like into the dust cover 3 can be suppressed. Thus, adhesion of the mud and the like to the piston rod 2 can be prevented more effectively, and the outer periphery of the piston rod 2 can be protected more effectively.

As indicated by a broken line in FIG. 3, a scraper 4c in sliding contact with the inner periphery of the dust cover 3 may be provided on the outer periphery of the flange 4b. As a result, the scraper 4c is brought into sliding contact with the inner periphery of the dust cover 3, and entry of the mud and the like into the dust cover 3 can be shut off and also, the mud and the like adhering to the inner periphery of the dust cover 3 can be scraped off with expansion/contraction of the shock absorber body D and can be discharged to the outside of the dust cover 3.

Figure 4:
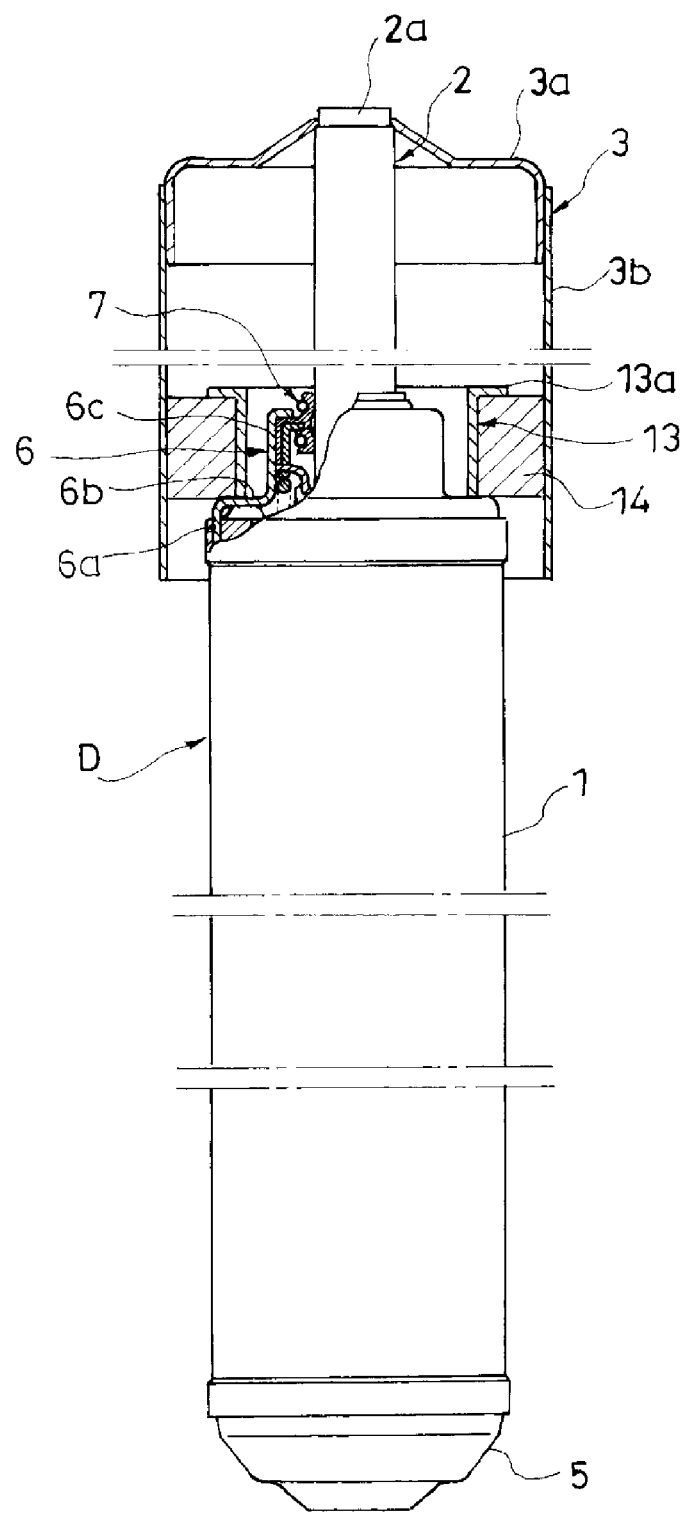
FIG. 4 is a side view of the shock absorber according to still another embodiment of the present invention.

On the other hand, as illustrated in FIG. 4, a dust filter 14 may be provided on an outer periphery of a collar 13. In this case, the collar 13 has a cylindrical shape, and the entire periphery on the outer shell side end which is a lower end in FIG. 4 is welded and fixed to the upper surface of the flange portion 6b of the seal case 6 and is attached to the outer shell 1. A flange 13a extended toward the outer periphery is provided on the piston rod side end of the collar 13.

The dust filter 14 has an annular shape and has an inner periphery side brought into contact with the outer periphery of the collar 13 and is interposed between the flange portion 6b of the seal case 6 and the flange 13a of the collar 13. That is, the dust filter 14 is sandwiched by the flange portion 6b and the flange 13a and attached to the outer shell 1 through the seal case 6.

The outer periphery of the dust filter 14 is in sliding contact with the inner periphery of the dust cover 3 over the entire periphery. Since the dust filter 14 is located in the dust cover 3 even if the shock absorber body D is in the most expanded state, it is arranged in the dust cover 3 all the time regardless of the expansion/contraction state of the shock absorber body D.

The dust filter 14 may be anything as long as it can close the gap between the outer shell 1 and the dust cover 3 so as to prevent entry of the mud and the like into the dust cover 3 and to allow passage of air and may be sponge obtained by foam molding a synthetic resin, may be obtained by forming a brush in an annular shape, or may be obtained by laminating a plurality of annular meshes. Since the dust filter 14 allows passage of air, such a situation will not occur that the inside of the dust cover 3 is sealed, and a gas in the dust cover 3 exerts a spring reaction force and interferes with expansion/contraction of the shock absorber body D.

By mounting the dust filter 14 to the outer shell 1 as above, the dust filter 14 closes a gap between the dust cover 3 and the outer shell 1 and thus, entry of mud and the like into a space in the dust cover 3 and of the outer periphery of the piston rod 2 can be prevented, and adhesion of the mud and the like to the piston rod 2 can be prevented.

Moreover, since the outer periphery of the dust filter 14 is brought into sliding contact with the inner periphery of the dust cover 3, shaft misalignment of the dust cover 3 in a radial direction can be suppressed.

The collar 13 may have a bent portion provided in the outer shell 1 similarly to the shock absorber illustrated in FIG. 2 and fixed.

The embodiments of the present invention described above are merely illustration of some application examples of the present invention and not of the nature to limit the technical scope of the present invention to the specific constructions of the above embodiments.

The present application claims a priority based on Japanese Patent Application No. 2012-116199 filed with the Japan Patent Office on May 22, 2012, all the contents of which are hereby incorporated by reference.

The invention claimed is:

1. A shock absorber comprising:
   a shock absorber body having a cylindrical outer shell, and a piston rod capable of going in/out of the outer shell and adapted to generate a damping force suppressing relative movement of the piston rod in an axial direction with respect to the outer shell;
   a cylindrical dust cover connected to the piston rod and adapted to allow entry of the outer shell to an inside;
   a cylindrical collar attached to the outer shell and arranged on an outer periphery of the piston rod;
   a seal member; and
   a cylindrical seal case provided on a piston rod side end of the outer shell, the seal case having
      a cylindrical large-diameter portion attached to an inner periphery of the piston rod side end of the outer shell,
      an annular flange portion extended from a piston rod side end of the large-diameter portion to an inner periphery side, and
      a cylindrical small-diameter portion having a portion extended from the inner periphery of the flange portion to a piston rod side end of the small-diameter portion, wherein
   the collar is mounted to the flange portion,
   the small-diameter portion accommodates the seal member, and
   the collar is welded to the flange portion so as to be fitted to the outer shell through the seal case and surround the small-diameter portion.

2. The shock absorber according to claim 1, wherein an outer shell side end of the collar is welded and fixed to the seal case over the entire periphery of the outer shell side end of the collar.

3. The shock absorber according to claim 1, further comprising:
   an annular dust filter having an inner periphery attached to the collar and an outer periphery in sliding contact with an inner periphery of the dust cover all the time.

4. The shock absorber according to claim 3, wherein:
   the collar has a flange extended from a piston rod side end of the collar to an outer periphery side; and
   the dust filter is fixed by the flange.

5. The shock absorber according to claim 1, wherein the collar has a flange extended from a piston rod side end of the collar to an outer periphery side.

6. The shock absorber according to claim 1, wherein an upper end of the collar is set to be higher than an upper end of the seal member in an upright position of the shock absorber where the dust cover is located above the outer shell.

7. A shock absorber comprising:
 a shock absorber body having a cylindrical outer shell, and a piston rod capable of going in/out of the outer shell and adapted to generate a damping force suppressing relative movement of the piston rod in an axial direction with respect to the outer shell;
 a cylindrical dust cover connected to the piston rod and adapted to allow entry of the outer shell to an inside;
 a cylindrical collar attached to the outer shell and arranged on an outer periphery of the piston rod to be on an outside of the outer shell; and
 a seal member for sealing the outer periphery of the piston rod, wherein
 the outer shell has a bent portion having a piston rod side end bent to an inner periphery side;
 the collar has an annular fixing flange extended from an outer shell side end to an outer periphery side;
 the collar is attached to the outer shell by gripping the fixing flange by the bent portion; and
 the bent portion is configured to fix the seal member to the outer shell.

8. The shock absorber according to claim 7, further comprising an annular dust filter having an inner periphery attached to the collar and an outer periphery in sliding contact with an inner periphery of the dust cover all the time.

9. The shock absorber according to claim 7, wherein the annular fixing flange is in direct contact with the bent portion.

* * * * *